Patented Dec. 15, 1936

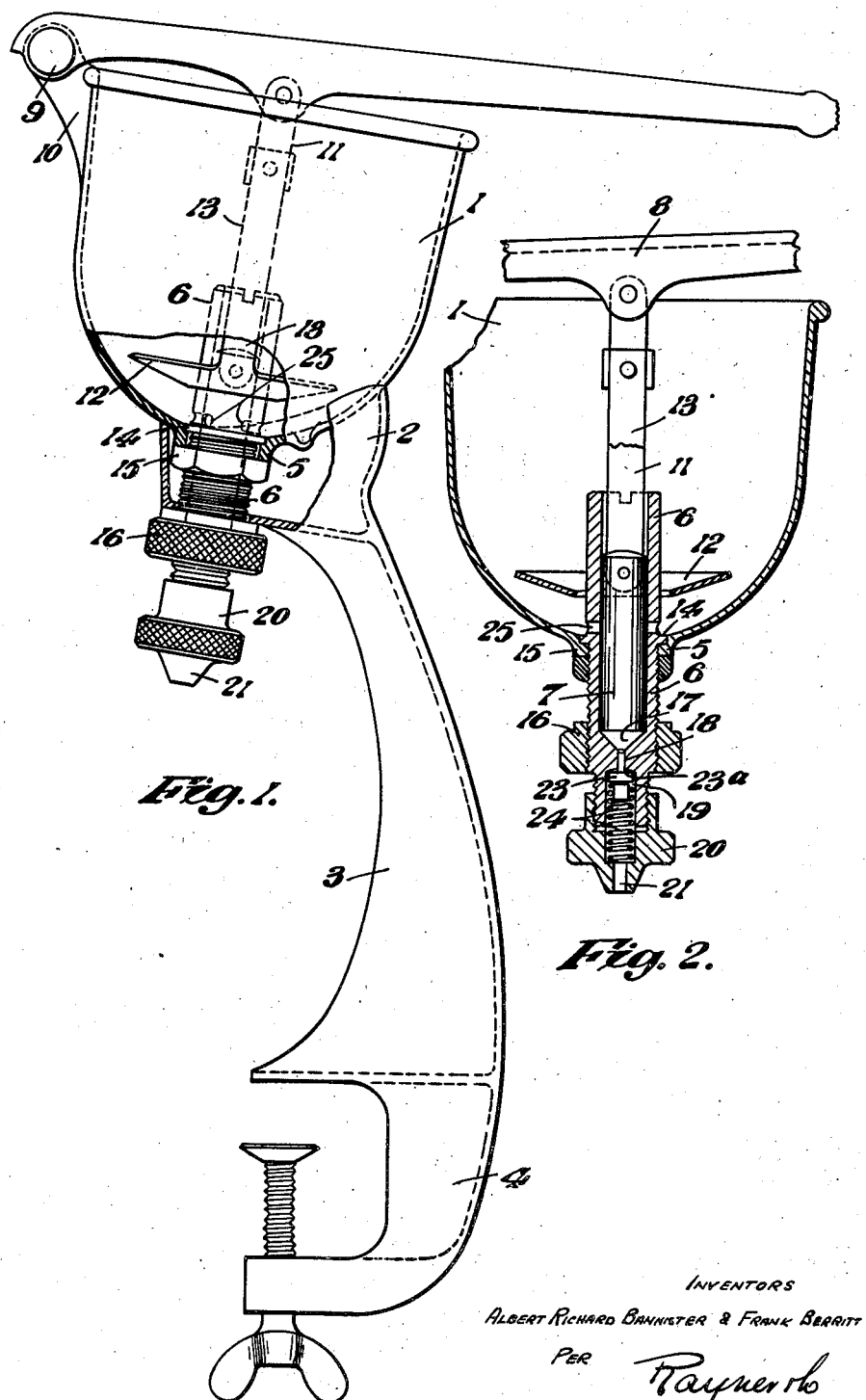

2,064,402

UNITED STATES PATENT OFFICE 2,064,402

EMULSIFICATION OF BUTTER AND MILK FOR THE PRODUCTION OF ARTIFICIAL CREAM

Albert Richard Bannister, Sunbury-on-Thames, and Frank Berritt Day, Teddington, England, assignors to British Emulsifiers Limited, Middlesex, England Application April 20, 1934, Serial No. 721,458
In Great Britain October 19, 1933

11 Claims. (Cl. 99—267)

This invention comprises improvements in or relating to the emulsification of butter and milk for the production of artificial cream and has for its object to provide an improved method of preparing the materials so that salt may be eliminated from the butter. It is found in practice that almost all forms of butter contain a percentage of salt and unless this salt is removed it has a very deleterious effect upon the flavour of the artificial cream produced. The invention also contemplates suitable apparatus for eliminating the salt from the butter and for emulsifying the desalted butter and milk so as to produce the artificial cream.

The process for the emulsification of milk and butter to produce artificial cream according to this invention is characterized by melting the butter in a vessel in which it is mixed with milk, said melting being effected by adding hot water to the butter in advance of the addition of milk, the quantity of hot water being sufficient to dissolve the salt out from the butter, the hot water with the salt obtained from the butter being decanted from vessel leaving the butter free of salt.

According to the preferred form of the present invention emulsifying apparatus for the production of artificial cream from milk and butter is characterized by the provision of means whereby the salt content of the butter may be dissolved in hot water and drawn off with the water from the butter so as to leave de-salted butter in the emulsifying apparatus ready for the addition thereto of milk and the emulsifying operation.

One form of the present invention briefly consists in the provision with emulsifying apparatus of a receptacle for the accommodation of milk and butter, means for agitating the milk and butter, a restricted passage for the emulsification of the milk and butter, means for extruding the milk and butter through said passage, and means for readily, freely decanting hot water from said receptacle separately from the butter after the hot water has been in intimate contact with the butter whereby the salt constituent of the butter may be dissolved in the water to leave a de-salted butter in the said receptacle.

In carrying this invention into practice the butter is placed in a receptacle forming a part of the emulsifying apparatus together with a sufficient quantity of hot or boiling water to cause the butter to be completely melted. The salt in the butter will become dissolved in the water whilst the melted butter will float upon the surface of the water. The receptacle is provided with an aperture near its lower end so that the water with the dissolved salt may be drawn off and this aperture is preferably provided through the pump which effects the emulsification. A convenient arrangement consists in mounting the pump axially in the base of the receptacle with the upper portion of the pump cylinder projecting upwardly into the receptacle. Inlet apertures are provided in the side of the cylinder within the receptacle and near the base thereof which apertures may be conveniently controlled by the piston or plunger which effects the pumping of the butter and milk mixture through an emulsifying aperture. The emulsifying device with a suitable discharge aperture is so mounted upon the lower end of the cylinder that it may be readily detached or released to provide a free passage for the salt water when the piston is raised to a position to uncover the inlet apertures from the receptacle to the cylinder. The whole device is mounted upon a suitable frame or stand having a base or clamp by means of which it may be mounted upon a bench or table or other suitable support. The upper end of the plunger, which is movable in the cylinder, is connected by a suitable link to a lever one end of which is pivoted to a portion of the frame and the other end of which is shaped to form a handle by means of which it may be oscillated about its pivot for the purpose of operating the plunger. Connected by suitable links to the plunger or its connecting link or to the operating lever is an agitating device which is located in the receptacle and may be located around the upwardly projecting portion of the cylinder. When the handle is operated to raise and lower the piston or plunger this agitating device will also be raised and lowered in the receptacle thus agitating the material in the receptacle.

In order that the invention may be clearly understood and readily carried into effect a sheet of drawings is appended hereto illustrating an embodiment thereof and wherein:—

Fig. 1 is a part sectional side elevation view of a complete apparatus, and

Fig. 2 is a broken sectional side elevation view showing the mixing receptacle removed from the base or pedestal and showing the preferred arrangement of valve and discharge orifice for the emulsifying action.

Referring to the drawing the device shown comprises a cup-shaped receptacle 1 engaged by its base against the rim of a substantially cylindrical upper end 2 of a pedestal 3 having a screw clamp bracket lower end 4 by means of which it can be readily clamped to a table. The centre of the base of the receptacle 1 has a boss 5 apertured to receive a tubular member 6 constituting a cylinder for a plunger type of pump, the plunger being a cylindrical pin 7 reciprocated in the cylinder 6 by a lever 8 pivoted at one end by a pin or thumb screw 9 to a lug 10 adjacent to the rim of the receptacle 1, a link 11 connecting the said lever to the plunger 7.

Milk and butter are mixed in the receptacle 1 and agitated by a suitable agitator which may be an annular shallow cone 12 freely disposed about the cylinder 6 and formed at the lower ends of a pair of integral, diverging links or arms 13 secured at their upper ends to the link 11.

The cylinder 6 has a flange 14 which seats in a recess in the base of the receptacle 1, and below this flange the cylinder 6 is threaded to receive a nut 15 which by abutting against the boss 5 draws the flange 14 tight into the case of the receptacle and provides a simple method of readily detachably securing the cylinder in place. A further nut 16, preferably a milled nut is threaded on to the lower part of the cylinder 6 and by abutting against the base of the substantially cylindrical upper part 2 of the pedestal 3 draws the receptacle 1 tight against the rim of the said part 2 and holds the receptacle firmly in position. Any suitable number of apertures 25 in the side of the cylinder 6 just above the flange 14 permit the contents of the receptacle 1 to pass into the cylinder 6.

The part of the cylinder 6 which is bored to receive the plunger 7 terminates at its lower end in a conical base 17 having a small bore outlet passage 18 at its centre communicating with a valve chamber 19 integral with the cylinder 6 and about which is threaded a milled cap 20 having an outlet nozzle 21 for the extrusion of the emulsified material and also for the outflow of hot water in a manner and for a purpose to be further described.

The valve in the chamber 19 is a small pin 22 and this pin is of such a fit in the aperture 18 or is so shaped as to provide a restricted passage through which the mixture to be emulsified is forced by the plunger 7 operating in the cylinder 6. The valve is provided with an enlarged collar 23, the upper face of which normally engages against the seating around the lower end of the aperture 18 and is held against this seating by means of a coiled compression spring 24 located in the chamber 19 and the hollow interior of the screw-threaded cap 20 engaged upon the projecting lower end of the cylinder. A number of fine, radiating grooves 23a may be provided in the face of the valve seating to assist in the emulsifying action. The collar on the valve is of such a size and shape that it fits closely in a recess in the end of the cylinder so as to form a second restricted passage through which the mixture is forced so that the emulsification may be effected in two stages. By unscrewing or releasing the cap 20 the valve may be released from its seating or entirely removed so as to provide a free passage to enable hot water, in which is dissolved the salt of the butter, to be drawn off before the operation of emulsifying the butter and milk is carried out.

The method of producing artificial cream from butter and milk according to this invention is carried out as follows:—

The lever 8 of the machine is placed in such a position that the plunger 7 covers the inlet apertures 25 from the receptacle to the cylinder. The cap 20 at the base of the cylinder is released or removed to provide a free outlet. The required quantity of butter together with a sufficient quantity of hot or boiling water is then placed in the receptacle and when the butter is thoroughly melted and after allowing a sufficient time for the salt to be dissolved in the water and for the butter to separate out on the surface of the water then the plunger 7 is raised so as to uncover the inlet apertures 25 to the cylinder. The water with the dissolved salt will then run through these apertures into the cylinder and out from the opening 18 at the base thereof and may be collected in a suitable receptacle. When all the water has been drawn off, the plunger is then lowered so as to cover the inlet apertures from the receptacle to the cylinder. The cap 20 with the valve is replaced in position or tightened up so that the valve will effectively engage in the outlet aperture from the cylinder and will be held in position by its spring. The desired quantity of milk is then added to the receptacle and the handle 8 is operated so as to raise and lower the plunger in the cylinder and at the same time raises and lowers the agitator or mixing device 12 in the receptacle 1. The milk and butter will thus be thoroughly mixed and at the same time will be drawn from the container into the cylinder and forced by the plunger through the emulsifying aperture and will be discharged in the form of a thoroughly emulsified mixture of artificial cream. This operation continues until the whole of the mixture has been drawn from the container and pumped through the emulsifying aperture or until the desired quantity of artificial cream has been obtained.

We claim:—

1. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom, and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, said bowl being provided with a stand to support the bowl substantially elevated above a horizontal shelf or table attached to the lower side of said bowl and extending downwardly away from the side of said bowl so as to leave the bottom of the bowl accessible, and so that a receiver may be placed upon said shelf or table below said bowl to receive the mixture or emulsion so prepared.

2. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom, and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, said cylinder being provided with inlet ports through the sides thereof just above the bottom of the bowl which are alternately opened and cut off by the plunger in its reciprocating movement.

3. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom and a plunger extending vertically downwardly inside said bowl into and closing the upper end of said cylinder, a homogenizing restriction device closing the lower end of said cylinder, said cylinder being supplied with the materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, the lower end of said cylinder being threaded and said restriction device including a tapped cup carrying a restriction element, said tapped cup being screwed onto the threaded end of said cylinder 4. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, said cylinder being connected to said bowl and said restriction device being connected to said cylinder by readily detachable threaded connections.

5. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, the central part of said extension and said plunger and agitator being connected by a pivotal link depending from said extension.

6. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, the top of said plunger being slotted and receiving the lower end of a pivotal link which is held and pivotally mounted in said slot by a transverse pin, the upper end of said link being pivotally connected to said extension.

7. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, the lower end of said cylinder being closed by a wall provided with a small axial opening and said restriction device being provided with a face member to closely fit against the lower end of said cylinder, said face member having a pin extending into and filling said opening.

8. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom, and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, said agitator consisting of a frustroconical sheet metal section extending concentrically around said piston.

9. A manually operable household homogenizer for making cream from butter and milk and for preparing other similar mixtures and emulsions for human consumption, said homogenizer comprising a bowl to receive the liquid materials to be homogenized, a pump having a cylinder extending substantially vertically through the bottom of said bowl and on both sides of said bottom, and a plunger extending vertically downwardly inside said bowl into and closing the upper end of said cylinder, a homogenizing restriction device closing the lower end of said cylinder, said cylinder being supplied with the liquid materials from adjacent the bottom of the bowl, an agitator in said bowl connected to reciprocate with said plunger, and a manual actuator provided with an extension extending diametrically across the top of said bowl, said extension having pivotal mounting means on the side of said bowl and also provided with a handle extending horizontally outwardly from said bowl, said extension being connected to said plunger and agitator to cause said plunger and agitator to reciprocate upwardly and downwardly together, said bowl being provided with an eye at one end thereof and said extension being pivotally mounted at said eye by a stud member, said stud member being provided with a detachable screw connection to said eye.

10. A homogenizer comprising a bowl to receive the liquid materials to be homogenized, a pump cylinder extending substantially vertically through the bottom of said bowl, a plunger extending vertically within said cylinder and closing one end of said cylinder, an outlet port connection from said cylinder including a readily removable homogenizing restriction device, said cylinder having a liquid inlet opening from said bowl at the bottom of said bowl, and means for reciprocating said plunger within said cylinder, said homogenizing restriction including a small bore passage through the lower end of said cylinder, a disc valve closing the end of said passage and provided with a pin extending into said passage, a resilient means to seat said disc valve, and manually adjustable means to vary the tension on said spring.

11. A homogenizer comprising a bowl to receive the liquid materials to be homogenized, a pump cylinder extending substantially vertically through the bottom of said bowl and on both sides of said bottom, a plunger extending vertically downwardly within said bowl and closing the upper end of said cylinder, a readily removable homogenizing restriction device closing the lower end of said cylinder, said cylinder having liquid inlet openings within said bowl at the bottom thereof, and means for reciprocating said plunger within said cylinder.

FRANK BERRITT DAY.
ALBERT RICHARD BANNISTER.